W. C. YATES.
MOTOR CONTROL SYSTEM.
APPLICATION FILED JULY 2, 1912.
1,077,662.
Patented Nov. 4, 1913.
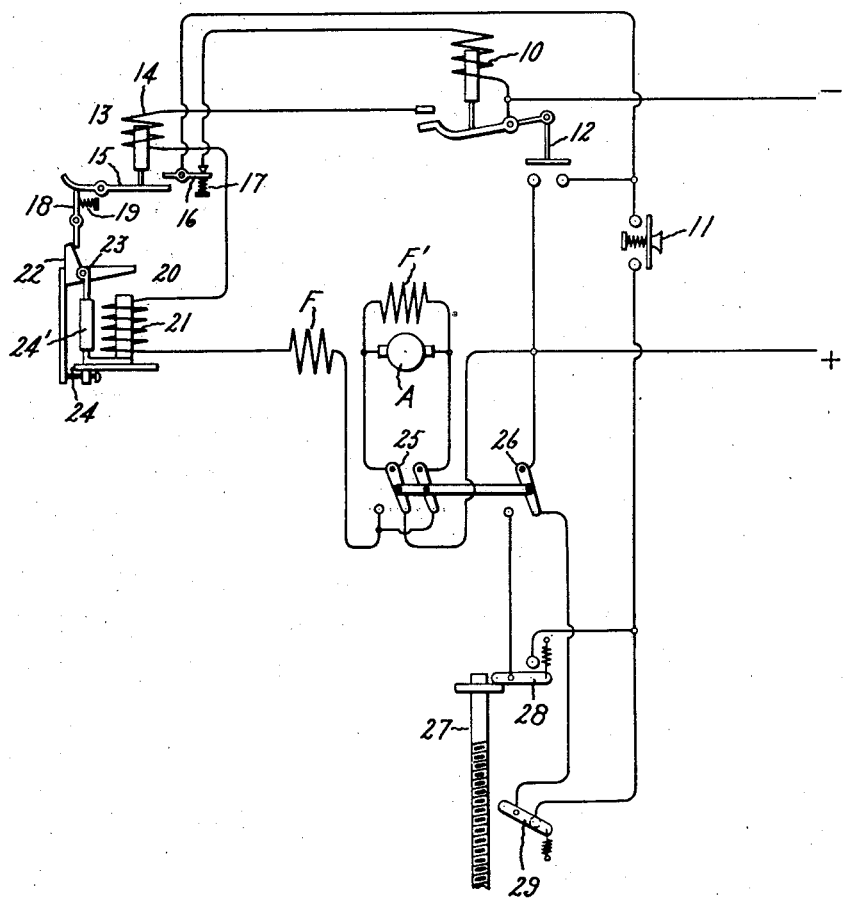
WITNESSES:
INVENTOR:
WILLIAM C. YATES,
BY
HIS ATTORNEY.

UNITED STATES PATENT OFFICE.

WILLIAM C. YATES, OF NEW YORK, N. Y., ASSIGNOR TO GENERAL ELECTRIC COMPANY, A CORPORATION OF NEW YORK.

MOTOR-CONTROL SYSTEM.

1,077,662.      Specification of Letters Patent.      Patented Nov. 4, 1913.

Application filed July 2, 1912. Serial No. 707,149.

*To all whom it may concern:*

Be it known that I, WILLIAM C. YATES, a citizen of the United States, residing at New York, county of New York, State of New York, have invented certain new and useful Improvements in Motor-Control Systems, of which the following is a specification.

This invention relates to the control of electric motors and has for its object the provision of means whereby an electric motor may be started, stopped and generally controlled under abnormal circuit conditions in a reliable and efficient manner.

In the dynamic braking of electric motors it is sometimes necessary to throw a very heavy overload upon the motor during the starting operation. In such cases it is also sometimes desirable to provide for the stopping of the motor upon a smaller overload than occurs at starting. If this overload device were operatively connected in circuit during starting it would of course operate to open the motor circuit so as to prevent the starting of the motor. A condition of this kind sometimes occurs in the case of a motor operated valve. These valves are frequently jammed closed and require several times the normal running current to start them. The motor is generally designed to stand this heavy overload and in fact may be connected across the line without damage. In closing the valve it is customary to provide an overload device which will open the motor circuit when the valve has been seated with a predetermined pressure. Since it takes much more power to start the valve from closed position than it does to close it, this overload device must operate at a less overload than would occur during starting.

One of the objects of my invention is to provide a simple and efficient arrangement of this character which will not open during a heavy overload such as may occur during the starting operation but will become operative to stop the motor upon the appearance of a second predetermined overload.

Other objects and purposes of my invention will appear in the course of the following specification in which I have shown my invention embodied in concrete form for purposes of illustration.

Referring to the drawings it will be seen that I have illustrated my invention in connection with a motor for opening and closing a valve. A represents the armature of the motor to be controlled. This motor I have shown as being compound wound, since by suitably compounding the motor it may be connected directly across the line without the use of starting resistance.

F represents the series field and F' the shunt field of the motor.

For purposes of illustration I have shown the motor as being started without any starting resistance although my invention is not limited in this respect. An electro-magnetic switch or contactor 10, controlled by a normally open push button 11, is arranged to close the motor circuit. This contactor is provided with an interlocking contact 12 which when the contactor closes short circuits the push button 11 and the other control switches.

13 represents the overload device consisting of the winding 14 in series with the motor armature, and a pivoted member 15 operated thereby. This overload device operates to open and close the circuit of the winding of the contactor 10 by means of a switch 16 normally closed by means of a spring 17 and arranged to be opened by the engagement of the member 15 with the switch 16, as shown in the drawing. The winding 14 is connected permanently in series with the motor armature so that upon a rush of current incident to the starting of the motor the overload device would normally operate unless restrained. In order to prevent the operation of this overload device I have shown for purposes of illustration a pivoted latch 18 held in the position shown in the drawing to lock the device against movement by a spring 19. This latch is operated to release the overload device by an electromagnetic device 20 which as illustrated also has a winding in series with the motor armature. Although my invention is not limited to this particular form of releasing device I have shown for purposes of illustration a device operating on the principle of the series contactor, described and claimed in application of Edwin J. Murphy, Serial No. 608,652, filed February 15, 1911. In the arrangement of this device upon a rush of current through the winding 21 the movable member 22 will not operate, but when the current decreases to a predetermined value due to the speeding up of the armature the member 22 will operate. The member 22 consists of the bell crank lever pivoted at 23, the lever normally assuming the position shown in the drawing. Upon a rush of current above a predetermined value, the lever will be held in its normal position as shown in the drawing, by the magnetic attraction across the air gap 24 due to the presence of the magnetic shunt 24' of limited magnetic carrying capacity. When, however, the current in the winding 21 decreases to the predetermined value, the member 22 will be turned on its pivot in a clockwise direction so as to operate the latch 18 against the tension of the spring 19. This will permit the member 15 of the overload device 13 to operate to open the switch 17, which in turn will open the motor circuit at the contactor 10. A double pole reversing switch 25 for the motor armature is mechanically connected with a single pole switch 26 controlling the circuit of the energizing winding of the contactor 10 so that the two switches will operate together.

27 represents the valve stem and 28 and 29 represent limit switches operated by the valve stem. These switches do not stop the motor but serve to prevent the control circuit being closed by the push button except to start the motor in the right direction.

As thus constructed and arranged, the operation of my device will be as follows: Assuming the parts are in the position shown in the drawing with the valve in the open position, when the push button 11 is closed by the operator the winding of the contactor 10 will be energized from the positive side of the line through the switch 26 and limit switch 29, contacts of switch 11, switch 16, winding of contactor 10 and back to the negative side of the line. This will cause the contactor to close the motor circuit from the positive side of the line, through one side of switch 25, motor armature A, opposite side of switch 25, series field F, through the windings 21 and 14 and the contacts of the contactor to the negative side of the line. The closing of the interlock contacts 12 short circuits the push button switch 11 and switches 26 and 29 so that these switches no longer have any control over the contactor. When the motor circuit is first closed there is a heavy rush of current especially since there is no starting resistance in series with the armature, the resistance of the windings 21 and 14 being negligible. Since the motor armature is connected to the valve, which may be jammed closed, the current may be several times the normal running current. The winding 21, however, does not operate the lever 22 since it is adjusted to hold out at this current. The overload device is therefore locked against closure during this starting operation. When, however, the motor comes up to speed so as to decrease the current in the winding 21, the member 22 will be operated due to the decrease of the flux across the gap 24 and the latch 18 will be operated to release the member 13. The motor will now run normally to move the valve toward closed position. When the full closed position is reached the motor will be stopped by pressing the valve against its seat sufficiently to cause an overload on the motor which will operate the overload device 13. This overload device is set to operate at a suitable pressure upon the valve seat and the operation of the overload device will stop the motor when this pressure is reached. When the valve starts to leave the open position the limit switch 28 will be closed by its spring so as to permit operation in an opening direction. When the valve reaches full closed position, the limit switch 29 is opened to prevent an attempt at further movement in a closing direction. To open the valve the switch 25 and the switch 26 will be thrown to the opposite position and the push button closed, whereupon the contactor 10 will be energized from the positive side of the line through limit switch 28 which is now closed, push button 11, switch 16, winding of contactor 10 and back to the negative side of the line. This closes the motor circuit for opposite direction of rotation to open the valve and when the full open position is reached the overload device will operate to stop the motor as before.

While I have described my invention as embodied in concrete form and as operating in a specific manner for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. The combination with an electric motor, of an overload device and means for rendering the same inoperative during the starting of the motor, and an electromagnetic device actuated by the motor current for rendering the same operative, said electromagnetic device being inactive during the starting of the motor.

2. The combination with an electric motor, of an overload device for stopping the same upon a predetermined current flow, means for locking said device against operation during the starting of the motor, and an electromagnetic device which is inactive during the starting of the motor for releasing said overload device.

3. The combination with an electric motor, of an overload device for stopping the same upon a predetermined current flow, means for rendering said device inoperative upon a heavier current flow, and an electromagnetic device having an actuating winding in series with the motor armature which is inactive during the heavier current flow for rendering said overload device operative.

4. The combination with an electric motor, of an electromagnetic device which is inactive during the starting of the motor having an actuating winding in series with the motor armature, and an overload device responsive to a current which is less than the starting current of the motor for stopping the motor, said overload device being inoperative during the starting of the motor rendered operative by the actuation of said electromagnetic device.

5. The combination with an electric motor, of an overload device for stopping the same upon a predetermined current flow, means for rendering said device inoperative upon a heavier current flow and an electromagnetic device having an actuating winding permanently in series with the motor armature and the winding of said overload device for rendering said overload device operative, said electromagnetic device being inactive during the heavier current flow.

6. The combination with an electric motor, of an overload device for stopping the same upon a predetermined current flow, means for locking said device against operation upon a heavier current flow, an electromagnetic device having an actuating winding in series with the motor armature for releasing said overload device, said electromagnetic device being inactive during the heavier current flow.

7. The combination with an electric motor, of an overload device for stopping the same upon a predetermined current flow, means for locking said device against operation during the starting of the motor, and an electromagnetic device having an actuating winding permanently in series with the motor armature and the winding of said overload device for releasing said overload device, said electromagnetic device being inactive during the starting of the motor.

In witness whereof, I have hereunto set my hand this 29th day of June, 1912.

WILLIAM C. YATES.

Witnesses:
 SUMNER BOWMAN,
 PETER J. McCOY, Jr.